March 29, 1949.　　　　W. J. MICHAEL　　　　2,465,548
LICENSE PLATE FASTENER
Filed May 27, 1946

INVENTOR:
WILLIAM J. MICHAEL
BY *William Isler*
ATTORNEY.

Patented Mar. 29, 1949

2,465,548

UNITED STATES PATENT OFFICE 2,465,548

LICENSE PLATE FASTENER

William J. Michael, Cleveland, Ohio, assignor to St. Clair Machine Products Company, Cleveland, Ohio, a partnership composed of Milton Alfred Roemisch and William J. Michael Application May 27, 1946, Serial No. 672,624

1 Claim. (Cl. 151—32)

This invention relates, as indicated, to means for fastening license plates and the like to vehicles.

A primary object of the invention is to provide a means of the aforesaid character which will enable license plates to be quickly and easily attached to vehicles, such as automobiles and trucks, and which means serve to firmly lock or clamp the license plate to the vehicle.

Another object of the invention is to provide fastener means of the character described, the use of which obviates the necessity of obtaining access to the rear of the brackets to which license plates are usually secured, access to such places being often extremely difficult.

A further object of the invention is to provide fastener means of the character described, which enable the license plate to be attached to such brackets by a simple movement of the license plate toward the bracket.

A still further object of the invention is to provide fasteners for the aforesaid purpose, which consist of a minimum number of parts which are inexpensive to manufacture, and which can be readily assembled and disassembled.

Other objects and advantages of the invention will be apparent during the course of the following description.

In the accompanying drawings, forming a part of this specification, and in which like numerals are employed to designate like parts throughout the same, Fig. 1 is a fragmentary view of the upper right hand portion of a license plate, showing the novel attachment means of the present invention;

Figure 1:
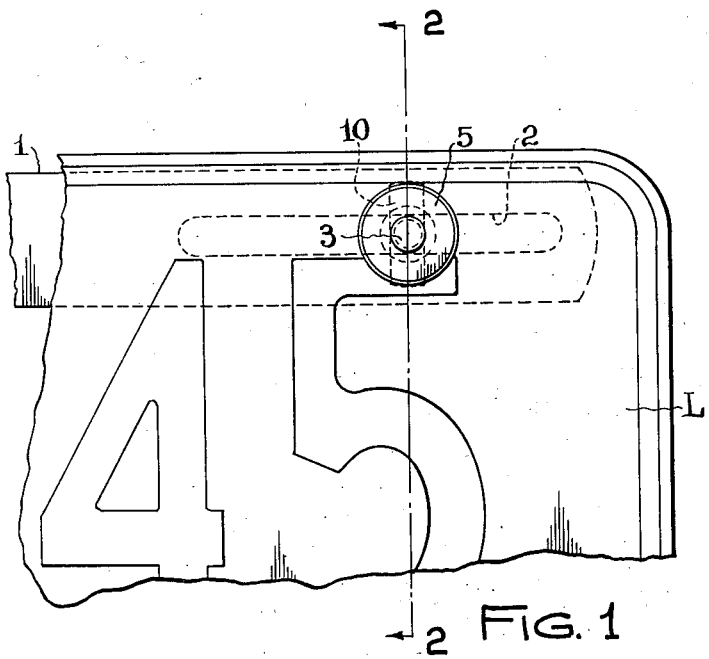

Referring more particularly to the drawings, reference numeral 1 designates a conventional type of bracket employed on automobiles and trucks for the attachment thereto of the license plate, said bracket being provided adjacent their ends with elongated slots 2, through which the bolts or screws commonly used for securing the license plate to the bracket, are inserted.

Instead of using the conventional type of fastener for thus securing the license plate to the bracket, I employ a novel form of fastener comprising a bolt 3, a nut 4, a lock-nut 5, a compression coil spring 6 and a washer 7.

Figure 4:
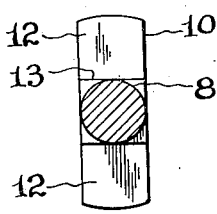
Fig. 4 is a cross-sectional view, taken on the line 4—4 of Fig. 3.

The body 8 of the bolt 3 is threaded for a portion of its length, as at 9, and is provided with a head 10 which forms a T with the body portion of the bolt. The head 10 has a spherical upper surface 11 and a substantially flat lower surface 12, and is of elongated form, such that its length is considerably greater than its width, the length, in this case, being substantially three times the width, as clearly shown in Fig. 4. The width of the head is substantially equal to the diameter of the body 8 of the bolt. Immediately below the head and adjacent the flat surface 12 of the head, the bolt is provided with a portion 13 of square cross-section, which is of slightly less length than the depth of the slot 2 in the bracket 1. Each side of this square portion 13 of the bolt is substantially equivalent in length to the diameter of the body 8 of the bolt.

The nut 4 has an annular outer surface which is knurled to facilitate turning of the nut, and the threaded opening 14 in the nut is counterbored as at 15 for the reception of one end of the spring 6.

The lock-nut 5 has an annular outer surface which is similarly knurled to facilitate rotation of the nut.

Before attachment of the license plate L to the bracket 1, the body 8 of the bolt is first inserted through the hole adjacent the corner of the license plate, the bolt body being inserted into the hole from the rear of the plate, thereby bringing the flat surface 12 of the bolt head into engagement with the rear surface of the plate. The washer 7 is then slipped on the bolt and brought into contact with the front surface of the license plate, after which the spring 6 is slipped over the bolt, and the nut 4 secured to the bolt, with one end of the spring 6 disposed in the counterbore 15 of the nut. The lock-nut 5 is then secured to the bolt to lock the nut 4 in position.

Similar fasteners are secured to the other corners of the license plate in the same manner, after which the license plate is ready for attachment to the bracket 1.

The bolts 3 are turned in such a manner as to place the heads 10 of the bolts with their long dimension parallel with the length of the license plate. With the heads thus positioned, and with the thumb and forefinger of each hand gripping the nuts 4 and 5 adjacent the upper part of the license plate, to thereby support the license plate, the license plate is brought against the bracket and the bolt heads inserted through the slots 2 in the bracket. The nuts 4 are pushed rearwardly against the springs 6, thereby compressing these springs between the nuts 4 and washers 7. This permits the bolt heads and the square portions 13 of the bolts to pass through the slots 2 and to move rearwardly until the squared portions of the bolts have cleared these slots, after which the nuts 4 and bolts are turned 90 degrees, thereby bringing the heads of the bolts to the vertical position shown in Figs. 1 and 2.

Figure 2:
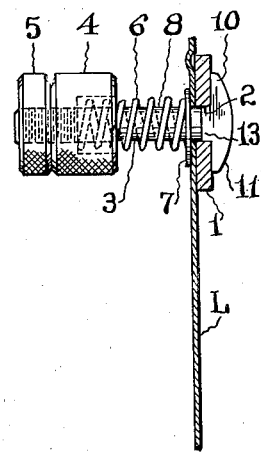
Fig. 2 is a fragmentary cross-sectional view, taken on the line 2—2 of Fig. 1.
Figure 3:
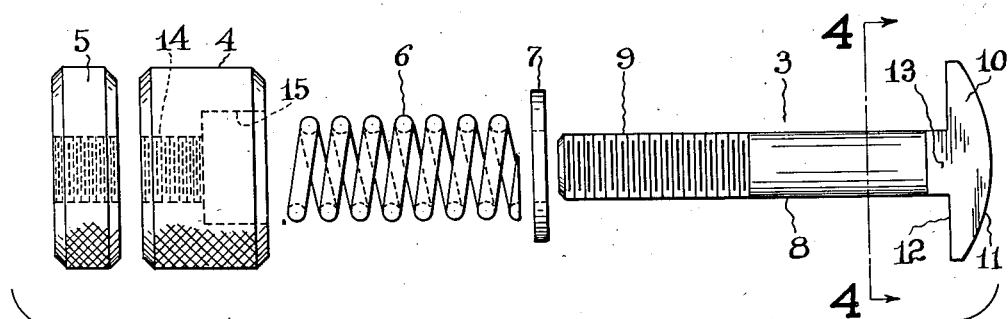
Fig. 3 is an exploded view of the novel fastener.

Upon release of pressure against the springs 6, the bolts will move forwardly sufficiently to cause the squared portions 13 of the bolts to re-enter the slots 2, as shown in Fig. 2, thereby locking the bolts against rotation, and securely locking the license plate to the bracket. The tension of the springs 6, may be adjusted by turning the nut 4, and then locking the nut 4 in adjusted position by means of the nut 5. In this manner, the degree of clamping of the license plate to the bracket 1 may be adjusted.

The lower portion of the license plate may then be secured to the lower part of the bracket in the same manner as the upper portion of the plate.

Removal of the license plate is effected by substantially a reversal of the steps of attaching the plate, as will be readily understood.

It is thus seen that I have provided a highly effective means of clamping and locking a license plate to a bracket, the use of which renders it unnecessary to gain access to the space at the rear of the bracket during the attachment of the license plate to the bracket.

It is to be understood that the form of my invention, herewith shown and described, is to be taken as a preferred example of the same, and that various changes in the shape, size and arrangement of parts may be resorted to, without departing from the spirit of my invention, or the scope of the subjoined claim.

Having thus described my invention, I claim:

A fastener for securing a license plate to a slotted bracket, said fastener comprising a bolt having a T-shaped elongated head and a square shank portion immediately adjacent said head, the head being adapted in one position to be inserted through the slot provided in the bracket and in a rotated position to engage portions of the bracket adjacent the edges of the slot and with the squared portion of said shank engaging the walls of the slot to prevent rotation of the bolt; an elongated threaded portion on the shank of said bolt, a nut having a bore extending entirely therethrough, said bore comprising a threaded portion and a counterbore in one face of said nut, said nut being threaded on said elongated portion for movement therealong, a washer on said shank adapted to bear against the face of said license plate, a spring encircling said shank and disposed between said nut and said washer and urging the washer against said license plate; one end of said spring resting against the washer and the other end resting within said counterbore of said nut, said nut being limited in its movement along the threaded portion of the bolt so as to be spaced at all times from the washer, and a lock nut on said bolt engaging said nut to lock the same in place.

WILLIAM J. MICHAEL.

REFERENCES CITED

The following references are of record in the file of this patent:

UNITED STATES PATENTS

| Number | Name | Date |
| --- | --- | --- |
| 1,262,991 | Steele | Apr. 16, 1918 |
| 1,266,804 | Herrington | May 21, 1918 |
| 1,593,555 | Albright | July 27, 1926 |
| 1,603,159 | Snyder | Oct. 12, 1926 |
| 2,177,215 | Hodgkinson | Oct. 24, 1939 |
| 2,318,548 | Whitehead et al. | May 4, 1943 |